United States Patent [19]

Hirokane et al.

[11] Patent Number: 5,629,908
[45] Date of Patent: May 13, 1997

[54] MAGNETO-OPTICAL RECORDING MEDIUM HAVING MAGNETIZATION VARIABLE BETWEEN IN-PLANE MAGNETIZATION AND PERPENDICULAR MAGNETIZATION

[75] Inventors: Junji Hirokane, Nara; Junichiro Nakayama; Michinobu Mieda, both of Shiki-gun; Akira Takahashi, Nara, all of Japan

[73] Assignee: Sharp Kabushiki Kaisha, Osaka, Japan

[21] Appl. No.: 536,168

[22] Filed: Sep. 29, 1995

[30] Foreign Application Priority Data

Nov. 25, 1994 [JP] Japan .................................... 6-291621

[51] Int. Cl.$^6$ .................................................. G11B 11/00
[52] U.S. Cl. .................... 369/13; 428/694 ML; 369/116
[58] Field of Search .................. 369/13, 14, 116, 369/275.2; 360/59, 114; 365/122; 428/694 ML, 694 SC, 694 MM, 694 MT

[56] References Cited

U.S. PATENT DOCUMENTS

| 5,450,382 | 9/1995 | Shiratori | 369/13 |
| 5,481,410 | 1/1996 | Osato et al. | 369/13 |
| 5,486,395 | 1/1996 | Murakami et al. | 369/13 |

FOREIGN PATENT DOCUMENTS

| 62-175948 | 8/1987 | Japan . | |
| 0258978A2 | 3/1988 | Japan . | |
| 581717 | 4/1993 | Japan | 369/13 |

OTHER PUBLICATIONS

English-language abstract of unexamined application JP 62-175948(A), published 1 Aug. 1987.

*Primary Examiner*—Tan Dinh
*Attorney, Agent, or Firm*—David G. Conlin; Milton Oliver

[57] ABSTRACT

A magneto-optical recording medium comprising a readout layer, an intermediate layer, and a recording layer. Two light beams having high and low light intensities respectively are applied while applying an external magnetic field. The magnetization direction of the recording layer is changed according to information, by reversing the sub-lattice magnetic moment of the readout layer in the case of the high light intensity. The intermediate layer exhibits a perpendicular magnetization during the irradiation, and also exhibits an in-plane magnetization at room temperature. Since it is not necessary to provide a device for generating a magnetic field for initializing every recording, it is possible to avoid increase in the size of the recording and reproducing apparatus. Moreover, the magnetization direction of the readout layer can be easily controlled with an external magnetic field, and the optical modulation overwriting property can be stabilized.

18 Claims, 8 Drawing Sheets

MAGNETO-OPTICAL RECORDING MEDIUM HAVING MAGNETIZATION VARIABLE BETWEEN IN-PLANE MAGNETIZATION AND PERPENDICULAR MAGNETIZATION

FIELD OF THE INVENTION

The present invention relates to a magneto-optical recording medium to be adopted in magneto-optical recording devices, such as a magneto-optical disk, a magneto-optical tape, a magneto-optical card, etc., and also concerns a method of recording and reproducing magneto-optical information using these devices.

BACKGROUND OF THE INVENTION

A magneto-optical disk memory has been put into practical use as a rewritable optical disk memory. However, in order to record information again in the already-recorded portion, it is necessary to record it after erasing previously recorded information. Therefore, it has a disadvantage in that it takes a long time to re-record.

In order to solve this problem, magnetic modulation overwriting is used as a method to perform overwriting, that is, recording without erasing already-recorded information before re-recording.

However, this method performs overwriting by modulating the size of the magnetic field to be applied. Therefore, it has a disadvantage in that a device for generating a magnetic field has to be arranged in the vicinity of the magneto-optical disk in order to obtain a magnetic field of a sufficient size. Moreover, it also has a disadvantage in that recording takes much time because it is not possible to modulate the magnetic field at a high speed.

Accordingly, in order to solve the above-described problems, Japanese Laid-Open Patent Application 175948/1987 (Tokukaisho 62-175948) discloses an optical modulation overwriting method. This method uses a magneto-optical recording medium having a double-layered structure composed of a recording layer and a recording auxiliary layer each of which is a film having a perpendicular magnetization, and modulates only the laser power of the light beam, thereby enabling overwriting.

This method, disclosed in Japanese Laid-Open Patent Application 175948/1987, enables optical modulation overwriting. However, since the magnetization direction of the recording auxiliary layer is changed when overwriting, it is necessary for each recording process to initialize the magnetization direction of the recording auxiliary layer before overwriting. Therefore, besides a device for generating a magnetic field for recording, a device for generating an initializing magnetic field is necessary. As a result, increased size and manufacturing costs of the apparatus are problems.

Moreover, another problem of conventional magneto-optical disk memories is as follows: when the diameter and the interval of the recorded bit is small compared with the diameter of the light beam of the focused semiconductor laser, the reproducing property deteriorates. This is because the focused laser beam covers adjacent recorded bits therein, thereby making it impossible to reproduce each recorded bit separately.

In order to solve such a problem, Japanese Laid-Open Patent Application 81717/1993 (Tokukaihei 5-81717) discloses a technique using a magneto-optical recording medium of a double-layered structure. Namely, this medium has both a readout layer, which is a film showing an in-plane magnetization at room temperature and which becomes a film showing a perpendicular magnetization according to rises in temperature, and a recording layer, which is a film showing a perpendicular magnetization. This disclosure proposes an optical modulation overwriting method which reproduces each recorded bit separately even if the recorded bit is smaller than the diameter of the laser beam, and which does not need an initializing magnetic field.

However, in the technique proposed in Japanese Laid-Open Patent Application 81717/1993, since the recording layer and the readout layer are directly in contact with each other, a magnetic exchange-coupling force therebetween is strongly exerted. Therefore, since the technique cannot easily control the magnetization direction of the readout layer by using the recording magnetic field, it has a problem in that the optical modulation overwriting property is unstable.

SUMMARY OF THE INVENTION

An object of the present invention is to provide a magneto-optical recording medium and a magneto-optical recording and reproducing method which do not need a device for generating an initializing magnetic field which arranges the magnetization direction before performing optical modulation overwriting, and which can prevent increases of both the size and the manufacturing cost of the apparatus.

Another object of the present invention is to provide a magneto-optical recording medium and a magneto-optical recording and reproducing method which can easily control the magnetization direction of the readout layer with an external magnetic field, thereby stabilizing the optical modulation overwriting property.

Still another object of the present invention is to provide a magneto-optical recording medium and a magneto-optical recording and reproducing method which can prevent signal contamination from adjacent bits causing noise, and can positively reproduce a recorded bit recorded with a pitch smaller than the spot diameter of the light beam, thereby remarkably increasing recording density.

In order to achieve the above-described object, a first magneto-optical recording medium in accordance with the present invention is characterized in that the magneto-optical recording medium comprises:

a recording layer which is constituted of a magnetic substance wherein information is magneto-optically recorded and which shows a perpendicular magnetization from room temperature $T1$ to a Curie temperature $Tc3$;

a readout layer which is provided on the recording layer, and which is constituted of a magnetic substance of a rare-earth transition metal alloy from which the information recorded in the recording layer is reproduced by receiving irradiation of a light beam, the readout layer having a compensation temperature $Tcomp1$ and showing a perpendicular magnetization from room temperature to a temperature $Tr2$; and an intermediate layer which is provided between the recording layer and the readout layer, which is constituted of a magnetic substance, the intermediate layer having a compensation temperature $Tcomp2$ and shows a perpendicular magnetization only in a temperature range from a temperature $Ti1$ to a temperature $Ti2$ including the $Tc3$ and an in-plane magnetization from room temperature to the $Ti1$.

In this arrangement, supposing that $T3$ indicates a temperature not lower than $Ti1$, not higher than $Tcomp1$, and not higher than Tcomp2; that T4 indicates a temperature not lower than Tc3, not lower than Tcomp1, not lower than Tcomp2, and not higher than Tr2; that and Hc1 and Hc3 respectively indicate a coercive force of the readout layer and a coercive force of the recording layer, for a predetermined magnetic field Hw, the following conditions are satisfied:

when a temperature is T1, Hc1<Hw and Hw<Hc3;
when a temperature is T3, Hc3<Hw and Hw<Hc1; and
when a temperature is T4, Hc1<Hw.

A second magneto-optical recording medium in accordance with the present invention is as described in the first magneto-optical recording medium and is characterized in that when compositions of the readout layer, the intermediate layer, and the recording layer are set respectively to $Gd_{0.28}(Fe_x Co_{1-x})_{0.72}$, $Gd_{0.28}(Fe_y Co_{1-y})_{0.72}$, and $Dy_{0.20}(Fe_{0.78}Co_{0.22})_{0.80}$, Y satisfies a condition 45%<Y<65%.

A first magneto-optical recording and reproducing method in accordance with the present invention is characterized in that the method comprises a recording step of recording information as a magnetization onto a recording layer and a reproducing step of reproducing the information as the magnetization recorded on the recording layer, wherein the recording step includes the steps of:

applying a magnetic field Hw onto the first or second magneto-optical recording medium in accordance with the present invention; and irradiating a light beam I having a low light intensity or a light beam II having a high light intensity alternatively onto the magneto-optical recording medium according to a recording signal, namely, (a) when irradiating a light beam I, making a sub-lattice magnetic moment of a rare-earth metal of the readout layer point in a direction of the Hw and making a magnetization direction of the recording layer point in a predetermined direction due to an exchange-coupling force from the readout layer; and (b) when irradiating a light beam II, making a sub-lattice magnetic moment of a rare-earth metal of the readout layer point in a direction reverse to the direction of the Hw and making a magnetization direction of the recording layer point in a predetermined direction reverse to the direction which the recording layer points when the light beam I is irradiated due to an exchange-coupling force from the readout layer, and the reproducing step includes the steps of:

irradiating a light beam III having a light intensity lower than the light intensity of the light beam I onto the first or second magneto-optical recording medium; and arranging a sub-lattice magnetization of the readout layer to a direction stable for a sub-lattice magnetization of the recording layer after irradiation of the light beam III.

According to the above arrangement, during recording, the magnetic field Hw is applied to the portion irradiated by the light beam in the magneto-optical recording medium in the same manner as the first magneto-optical recording and reproducing method. Note that the composition of each layer can be respectively arranged like that of the second magneto-optical medium, for example. The magnetization of the readout layer, referred to as M1 hereinafter, points in a direction that is the same as that of Hw since Hc1 is smaller than Hw at room temperature. The magnetization of the recording layer, referred to as M3 hereinafter, points in a predetermined direction, upward or downward, according to the recorded information. However, since the intermediate layer is a film showing an in-plane magnetization, M3 is not copied to the readout layer.

Here, like the first magneto-optical recording and reproducing method, (a) a light beam I having a low light intensity is irradiated so that the temperature of each magnetic layer is raised to T3, while the intermediate layer shows a perpendicular magnetization. Accordingly, an exchange-coupling force is exerted between the readout layer and the recording layer. In contrast, Hc1 is larger than Hw and Hc3 is smaller than Hw. Therefore, the exchange-coupling force copies the magnetization from the readout layer to the recording layer through the intermediate layer, and M3 points in a predetermined direction α, upward or downward.

When the temperature of each magnetic layer falls to T1 after irradiation of the light beam I, since Hc3 is larger than Hw, M3 still points in the direction α in spite of Hw. In contrast, the intermediate layer shows an in-plane magnetization. Therefore, since the exchange-coupling force is not exerted between the readout layer and the recording layer, M1 still points in a direction that is the same as that of Hw, that is, an initializing direction, in spite of M3. This means that the direction α is recorded in M3.

(b) Alternatively, a light beam II having a high light intensity is irradiated instead of the light beam I having a low light intensity so that the temperature of each magnetic layer is raised to T4, and Hc1 becomes smaller than Hw. Moreover, since the temperature is higher than Tcomp1, the sub-lattice magnetic moment of the transition metal of the readout layer grows large, so the readout layer becomes TM rich. Therefore, the sub-lattice magnetic moment of the rare-earth metal of the readout layer, referred to as R1 hereinafter, points reversely to the direction of Hw, and M1 points in the direction of Hw.

The magnetization of the intermediate layer shows an in-plane magnetization if T4 is between Ti2 and Tr2, and it comes into the same condition as that of the readout layer if T4 is between Tcomp2 and Ti2. In contrast, the magnetization of the recording layer disappears because its temperature is not lower than its Curie temperature Tc3.

In the temperature-falling process to T3 after irradiation of the light beam II, since the temperature is not higher than Tcomp1, the sub-lattice magnetic moment of the transition metal of the readout layer grows small so that the readout layer becomes RE rich again. On the other hand, the magnetization of the intermediate layer is either in-plane as described above, or is of the same condition as that of the readout layer. Moreover, the magnetization of the recording layer does not exist because its temperature is not lower than its Curie temperature Tc3. Therefore, R1 keeps pointing reversely to the direction of Hw, and M1 points in the direction of R1, that is, reversely to that of Hw.

When the temperature falls to T3, since Hc1 is larger than Hw, directions of R1 and M1 are fixed to the above-described directions respectively. On the other hand, since the intermediate layer shows a perpendicular magnetization, an exchange-coupling force is exerted between the readout layer and the recording layer. Therefore, the magnetization direction is copied from the readout layer to the recording layer through the intermediate layer, so the magnetization of the recording layer points in a predetermined direction β reverse to α, that is, downward if α is upward and is upward if α is downward.

When the temperature falls to T1, since Hc3 is larger than Hw, M3 stably keeps pointing in the above-described direction β in spite of Hw. On the other hand, since the intermediate layer shows an in-plane magnetization, the exchange-coupling force between the readout layer and the recording layer is no longer exerted or becomes weak, and meanwhile, since Hc1 is smaller than Hw, M1 is initialized to the direction of Hw. This means that the direction β is recorded in M3.

By providing the intermediate layer as described above, an exchange-coupling force is strengthened so as to help copying from the readout layer to the recording layer when the magnetization is copied, while the exchange-coupling force is weakend so as to prevent copying from the recording layer to the readout layer when the magnetization direction of the readout layer is initialized.

Therefore, enabling to reduce the intensity of the magnetic field necessary to initialization, it becomes possible to make initialization using the magnetic field Hw, which is used for recording. Consequently, it becomes unnecessary to provide a device for generating an initializing magnetic field arranging the magnetization direction before performing optical modulation overwriting, thereby making it possible to prevent increase in the size and increase in the manufacturing costs of the apparatus.

Moreover, since the intermediate layer controls the magnetic exchange-coupling force between the recording layer and the readout layer as described above, the magnetization direction of the readout layer can be easily controlled with an external magnetic field, and the optical modulation overwriting property can be stabilized.

During reproduction, the light beam III, whose light intensity is lower than that of the light beam I, is irradiated to the above-described magneto-optical recording medium, thereby raising the temperature of the layers to a predetermined temperature T2 lower than T3. Since an external magnetic field such as the magnetic field Hw is not applied at that time, the direction of M1 is determined according to the magnetic exchange-coupling force exerted from the recording layer. Though the intermediate layer shows an in-plane magnetization, it has a certain amount of the perpendicular magnetization component because it has been put between the readout layer and the recording layer which show perpendicular magnetizations. Therefore, the magnetic exchange-coupling force is exerted from the recording layer to the readout layer through the intermediate layer. Consequently, the direction of M1 is positively determined.

In this way, the magnetization recorded in the recording layer is copied to the readout layer and reproduced as information.

A third magneto-optical recording medium in accordance with the present invention is characterized in that the magneto-optical recording medium comprises:

a recording layer which is constituted of a magnetic substance where information is magneto-optically recorded and which shows a perpendicular magnetization from room temperature T1 to its Curie temperature Tc3;

a readout layer which is provided on the recording layer and which is constituted of a magnetic substance of a rare-earth transition metal alloy from which the information recorded in the recording layer is reproduced by receiving irradiation of a light beam, the readout layer having a compensation temperature Tcomp1, and showing a perpendicular magnetization only from a temperature Tr1 to a temperature Tr2 and an in-plane magnetization from room temperature to the Tr1; and an intermediate layer, which is provided between the recording layer and the readout layer and which is constituted of a magnetic substance, the intermediate layer having a compensation temperature Tcomp2 and which shows a perpendicular magnetization only in a temperature range from a temperature Ti1 to a temperature Ti2 including the Tc3 and an in-plane magnetization at temperatures not higher than the Ti1. In this arrangement, supposing that T3 indicates a temperature not lower than Ti1, not higher than Tcomp1, and not higher than Tcomp2; that T4 indicates a temperature not lower than Tc3, not lower than Tcomp1, not lower than Tcomp2, and not higher than Tr2; and that Hc1 and Hc3 respectively indicate a coercive force of the readout layer and a coercive force of the recording layer, for a predetermined magnetic field Hw, the following conditions are satisfied:

when a temperature is T1, Hc1<Hw and Hw<Hc3;
when a temperature is T3, Hc3<Hw and Hw<Hc1; and
when a temperature is T4, Hc1<Hw.

A second magneto-optical recording and reproducing method in accordance with the present invention is characterized in that the method comprises a recording step of recording information as a magnetization onto a recording layer and a reproducing step of reproducing the information as the magnetization recorded on the recording layer, wherein the recording step includes the steps of:

applying a magnetic field Hw onto the third magneto-optical recording medium in accordance with the present invention;

irradiating a light beam I having a low light intensity or a light beam II having a high light intensity alternatively onto the magneto-optical recording medium according to a recorded signal, namely, (a) when irradiating a light beam I, making a sub-lattice magnetic moment of a rare-earth metal of the readout layer point in a direction of the Hw and making a magnetization direction of the recording layer point in a predetermined direction due to an exchange-coupling force from the readout layer; and (b) when irradiating a light beam II, making a sub-lattice magnetic moment of a rare-earth metal of the readout layer point in a direction reverse to a direction of the Hw and making a magnetization direction of the recording layer point in a predetermined direction reverse to the direction which the recording layer points when the light beam I is irradiated, due to an exchange-coupling force from the readout layer, and the reproducing step includes the steps of:

irradiating a light beam III having a light intensity lower than the light intensity of the light beam I and having a distribution of light intensity where light intensity is higher in a center of the light beam than in a surrounding area surrounding the center, onto the magneto-optical recording medium; and arranging a sub-lattice magnetization of the readout layer to a direction stable for a sub-lattice magnetization of the recording layer after irradiation of the light beam III.

According to the above arrangement, during recording, the above-described magnetic field Hw is applied to the magneto-optical recording medium like the second magneto-optical recording and reproducing method. At this time, the magnetization of the readout layer, referred to as M1 hereinafter, shows an in-plane magnetization at room temperature. Moreover, the magnetization of the recording layer, referred to as M3, points in a predetermined direction, that is, upward or downward, according to the recorded information. However, since the intermediate layer shows an in-plane magnetization, M3 is not copied to the readout layer.

Here, a light beam I having a low light intensity and a light beam II having a high light intensity are alternatively irradiated as follows in the same manner as the second magneto-optical recording and reproducing method.

When the temperatures of the layers are raised to the temperature T2 in the vicinity of Tr1 due to irradiation of the light beams, since Hc1 is smaller than Hw, M1 points in the direction of Hw. Moreover, M3 points in a predetermined direction, and is not copied to the readout layer because the intermediate layer shows an in-plane magnetization.

Afterward, information is recorded similarly to the first magneto-optical recording and reproducing method, provided that the magnetization of the readout layer becomes in-plane again when the temperature falls to T1, which makes this method different from the first magneto-optical recording and reproducing method.

Consequently, it becomes not necessary to provide a device for generating an initializing magnetic field arranging the magnetization direction before performing optical modulation overwriting, thereby making it possible to prevent increase in the size and increase in the manufacturing cost of the apparatus.

Moreover, similarly to the first magneto-optical recording and reproducing method, by providing the intermediate layer, since the intermediate layer controls the magnetic exchange-coupling force between the recording layer and the readout layer, the magnetization direction of the readout layer can be easily controlled with an external magnetic field, and the optical modulation overwriting property can be stabilized.

Reproduction is performed as follows. The light beam III whose light intensity is lower than that of the light beam I is irradiated to the above-described magneto-optical recording medium, thereby raising the temperature of the layers to a temperature T2 lower than T3.

Here, the information recorded in the recording layer is reproduced substantially similiarly to the first magneto-optical recording and reproducing method. However, since the light intensity distribution of the light beam III shows a distribution where the intensity is higher in the center of the light beam than in the surrounding area, when the light beam III is irradiated, the temperature in the vicinity of the center of the irradiated portion is higher than that in the surrounding area in the readout layer. Therefore, in the readout layer, the temperature becomes not lower than T2, so the magnetization changes from the in-plane magnetization to the perpendicular magnetization only at the area in the vicinity of the center in the irradiated portion. Accordingly, the magnetization is copied from the recording layer to the readout layer only at the above-described area in the vicinity of the center.

Therefore, it is made possible to reproduce only the information from the area in the vicinity of the center of the readout layer irradiated with the light beam III. Consequently, it becomes possible to prevent signal contamination from adjacent bits causing a noise and to positively reproduce a recorded bit recorded with a pitch smaller than the spot diameter of the light beam, thereby remarkably increasing recording density.

DETAILED DESCRIPTION OF THE PREFERRED EMBODIMENTS

[First Embodiment]

Referring to FIGS. 1 through 4, the following description will discuss one embodiment of the present invention.

Figure 2:
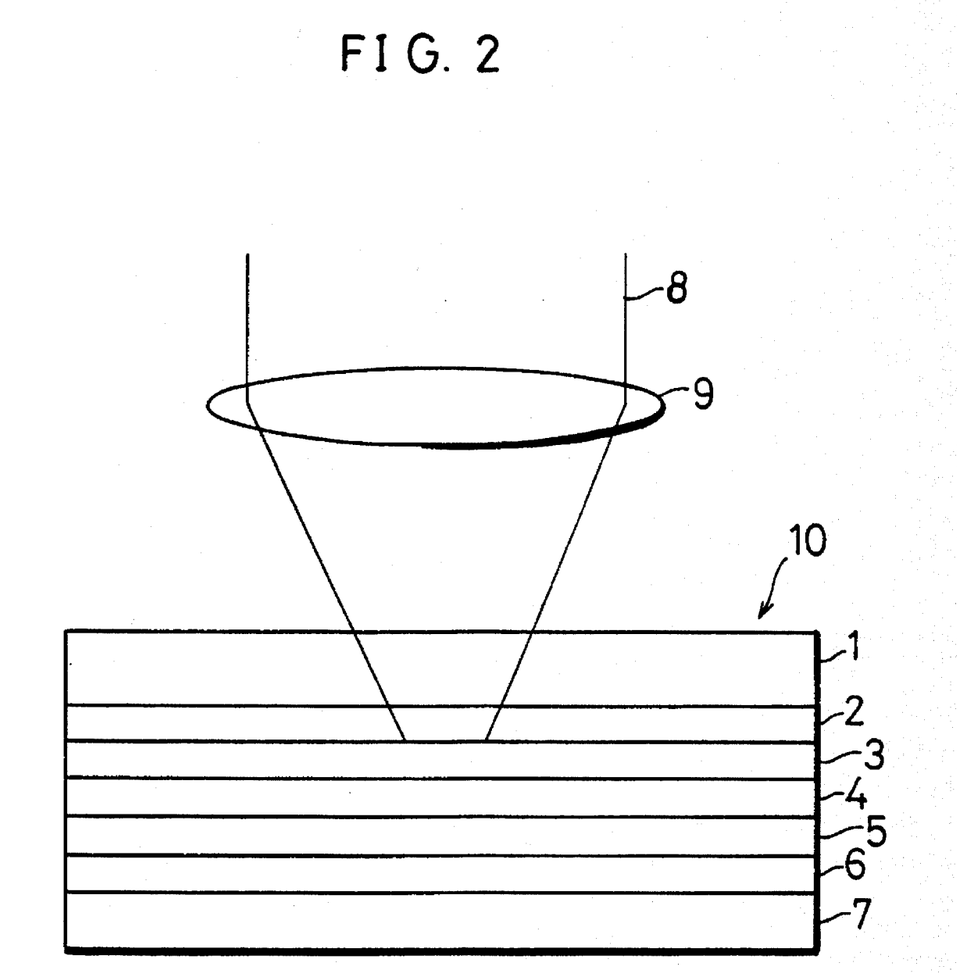
FIG. 2 is an explanatory figure showing the structure of the magneto-optical disk as shown in FIG. 1.

As shown in FIG. 2, a magneto-optical disk 10 (magneto-optical recording medium) in the present embodiment is arranged by stacking a substrate 1, a transparent dielectric layer 2, a readout layer 3, an intermediate layer 4, a recording layer 5, a protective layer 6, and a backcoating layer 7 in this order. Recording and reproduction are performed by focusing a laser beam 8 (light beam) onto the readout layer 3 through a focusing lens 9.

The substrate 1 is a disk-shaped glass substrate with an outer diameter of 86 mm, an inner diameter of 15 mm, and a thickness of 1.2 mm. Although not shown in FIG. 2, in the surface of one side of the substrate 1, there are provided guide tracks with lands and grooves for guiding a light beam. The guide tracks have a pitch of 1.6 μm, a width of grooves of 0.8 μm, and a width of lands of 0.8 μm. The transparent dielectric layer 2 is provided by forming an AlN layer of a thickness of 80 nm on the side where the guide tracks are provided in the substrate 1 to improve the reproducing property with a light interfering function.

Each of the readout layer 3, the intermediate layer 4, and the recording layer 5, which is an amorphous film composed of a rare-earth and transition metal alloy, is made of a ferri-magnetic material where the sub-lattice magnetic moment of the rare-earth metal and that of the transition metal are anti-parallel to each other.

The readout layer 3 is prepared by forming GdFeCo as a thin rare-earth and transition metal alloy film with a thickness of 40 nm. The readout layer 3 has a composition of $Gd_{0.28} (Fe_{0.65} Co_{0.35})_{0.72}$ and a compensation temperature of 250° C., and its magnetization condition is perpendicular at room temperature and in-plane at not lower than about 385° C.

The intermediate layer 4 is prepared by forming GdFeCo which is a thin rare-earth and transition metal alloy film with a thickness of 20 nm. The intermediate layer 4 has a composition of $Gd_{0.28} (Fe_{0.50} Co_{0.50})_{0.72}$ and a compensation temperature of 240° C., and its magnetization condition is in-plane from room temperature to 200° C., perpendicular at not lower than 200° C., and in-plane at not lower than 300° C.

The recording layer 5 is prepared by forming DyFeCo as a thin rare-earth and transition metal alloy film with a thickness of 40 nm. The recording layer 5 has a composition of $Dy_{0.20} (Fe_{0.78} Co_{0.22})_{0.80}$ and a Curie temperature of about 250° C.

The protective layer 6 is provided by forming an AlN layer of a thickness of 20 nm to prevent the magnetic layers from oxidation and erosion. Moreover, the backcoating layer 7 is provided by forming a polyurethane acrylate series ultraviolet-rays hardening resin of a thickness of 5 µm to prevent the magnetic layers from oxidation, erosion, and damage.

The guide tracks on the surface of the substrate 1 was formed directly onto the surface of the glass by reactive ion etching. Moreover, the transparent dielectric layer 2, the readout layer 3, the intermediate layer 4, the recording layer 5, and the protective layer 6 were together formed by the sputtering method by keeping a vacuous condition in the same sputtering apparatus.

Each AlN layer of the transparent dielectric layer 2 and the protective layer 6 was formed by a reactive sputtering method which sputters an Al target in an $N_2$ gas atmosphere.

The readout layer 3, the intermediate layer 4 and the recording layer 5 were formed by sputtering a so-called complex target where a Gd tip or a Dy tip is arranged on an FeCo alloy target, or by sputtering three-element alloy targets, that is, GdFeCo and DyFeCo targets, by using Ar gas.

The overcoating layer 7 was formed by spreading a resin with a spin coater and afterward hardening the resin by irradiating an ultra-violet ray by the use of an ultraviolet ray irradiating apparatus.

Figure 1:
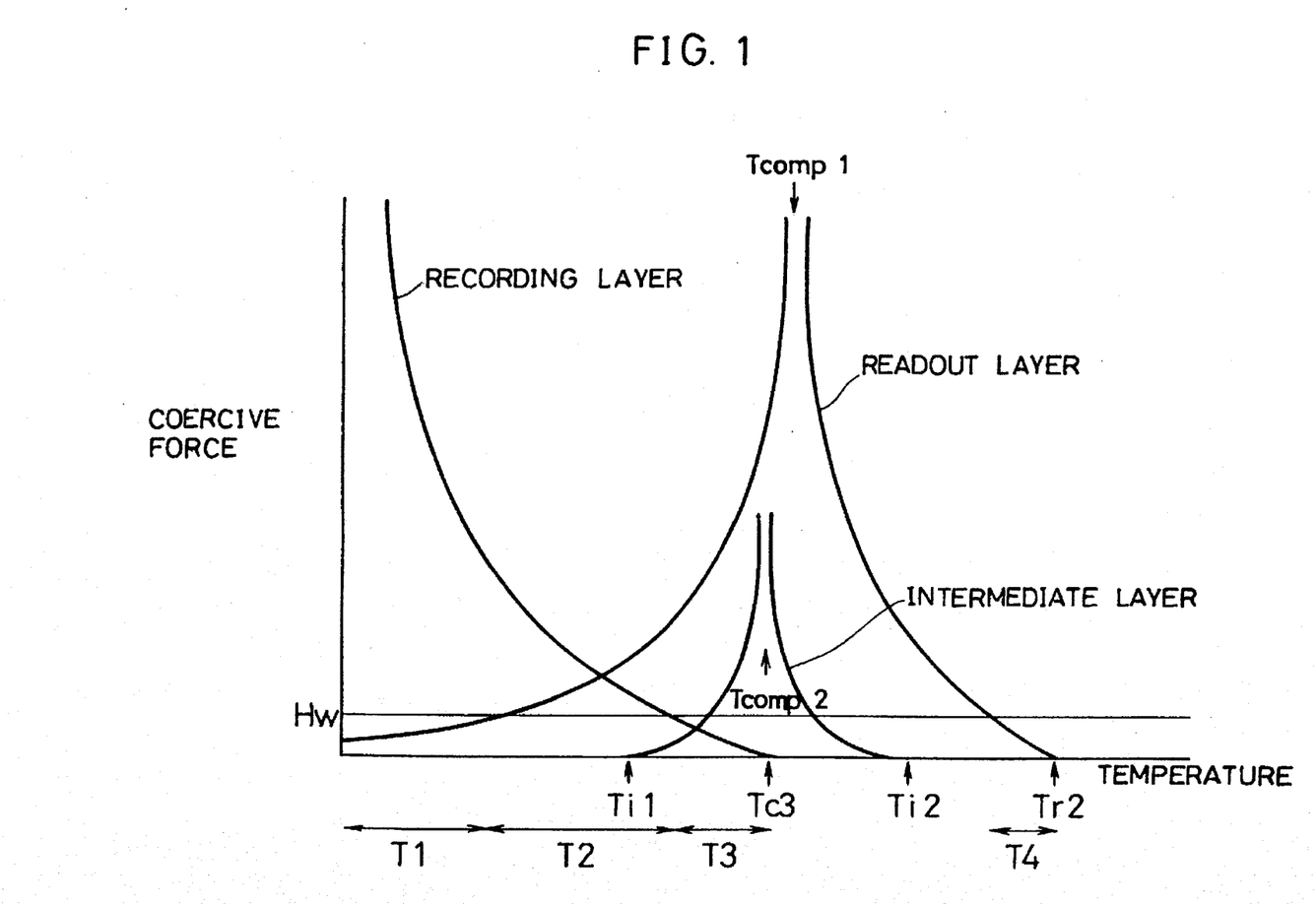
FIG. 1 is a graph showing the dependency of the magnetic property upon the temperature in the magnetic layers of a magneto-optical disk in one embodiment of the present invention.

Next, FIG. 1 shows conceptually a magnetic property of the magneto-optical disk 10 in the present embodiment that is provided with the above-described layers.

The recording layer 5 has its compensation temperature virtually at room temperature and its Curie temperature at a temperature Tc3. The readout layer 3 shows a perpendicular magnetization at room temperature T1, and has its compensation temperature Tcomp1 in the vicinity of the Curie temperature Tc3 of the recording layer 5. Moreover, the readout layer 3 has its Curie temperature at a temperature Tr2, or alternatively, shows an in-plane magnetization at temperatures not lower than the temperature Tr2. The intermediate layer 4 shows an in-plane magnetization at room temperature and a perpendicular magnetization at not lower than a temperature Ti1. Moreover, the intermediate layer 4 has its compensation temperature Tcomp2 in the vicinity of the Curie temperature Tc3 of the recording layer 5 and shows an in-plane magnetization at not lower than a temperature Ti2.

Moreover, the following definitions are made: T3 indicates a temperature not lower than Ti1, not higher than Tcomp1, and not higher than Tcomp2. T4 indicates a temperature not lower than Tc3, not lower than Tcomp1, not lower than Tcomp2, and not higher than Tr2. Hw indicates a recording magnetic field which is a magnetic field externally applied during recording. Hc1 and Hc3 respectively indicate the coercive force of the readout layer 3 and that of the recording layer 5. Moreover, the coercive forces Hc1 and Hc3 and the temperatures T1, T3, and T4 satisfy the conditions:

when the temperature is T1, Hc1<Hw and Hw<Hc3;

when the temperature is T3, Hc3<Hw and Hw<Hc1; and when the temperature is T4, Hc1<Hw.

Figure 3:
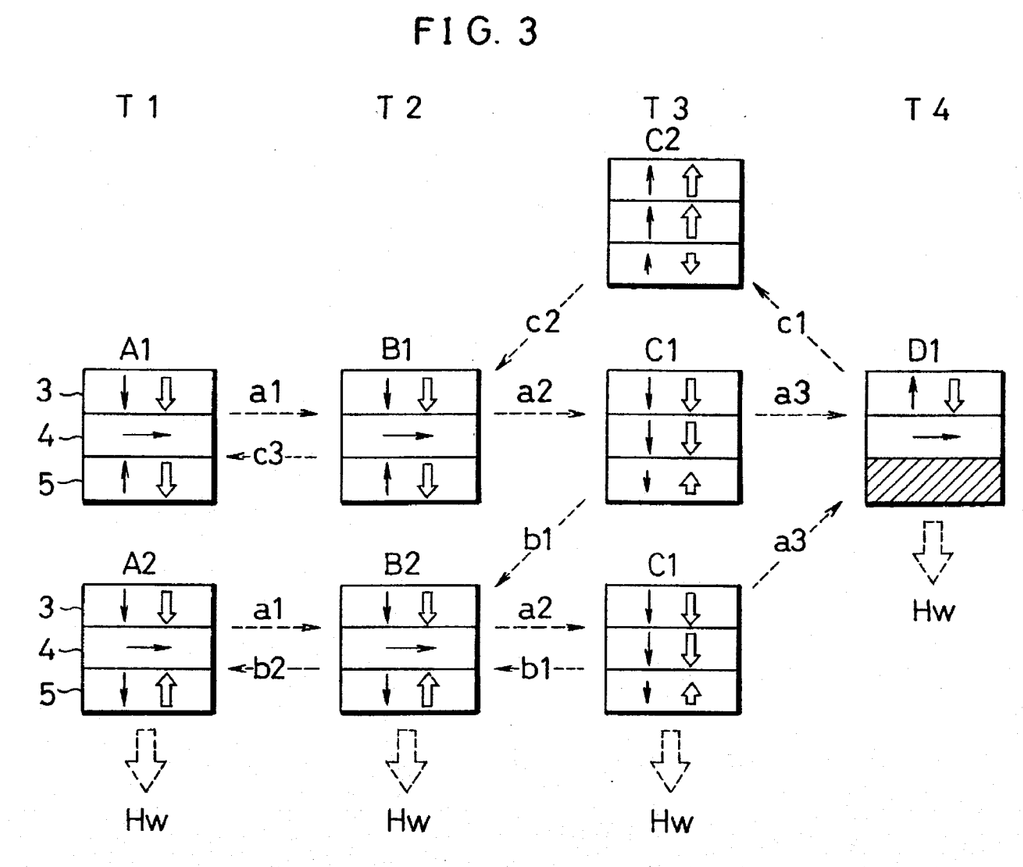
FIG. 3 is an explanatory figure showing the recording process in the magneto-optical disk as shown in FIG. 1.

Referring to FIG. 3, the next description will discuss a recording process that is carried out by optical modulation overwriting on the magneto-optical disk 10. In this figure, T1, T3, and T4 are the temperatures as described above. The temperature T2 is an arbitrary temperature lower than Ti1, and the temperature becomes higher in the order of T1, T2, T3, and T4. A1, A2, ..., B1, B2, ... indicate respective conditions shown in the figure. Each condition shows states of the readout layer 3, the intermediate layer 4, and the recording layer 5 at the highest box, the middle box, and the lowest box, respectively. In each layer, a black arrow indicates the direction of the sub-lattice magnetic moment of the rare-earth metal, and a white arrow indicates the direction of the total magnetization.

"RE rich" represents a condition wherein the sub-lattice magnetic moment of the rare-earth metal is larger than the sub-lattice magnetic moment of the transition metal. Meanwhile, "TM rich" represents a condition wherein the sub-lattice magnetic moment of the transition metal is larger than the sub-lattice magnetic moment of the rare-earth metal. When the layer is RE rich, the direction of the sub-lattice magnetic moment of the rare-earth metal and the direction of the total magnetization are parallel, while when the layer is TM rich, the direction of the sub-lattice magnetic moment of the rare-earth metal and the direction of the total magnetization are anti-parallel. In the magneto-optical 10, the readout layer 3 and the intermediate layer 4 are RE rich and the recording layer 5 is TM rich at room temperature.

Two conditions A1 and A2 exist dependently on the recorded information at room temperature. Namely, according to the recorded information, the magnetization of the recording layer 5, referred to as M3 hereinafter, points downward in the condition A1 and upward in the condition A2.

In the conditions A1 and A2, the recording magnetic field Hw pointing downward in the figure is applied from a magnetic field generating apparatus (not shown) onto a portion on the magneto-optical disk 10, which receives the light beam. Here, since Hc1 is smaller than Hw at room temperature, the magnetization of the readout layer 3, referred to as M1, points in the direction of Hw (downward in the figure). Moreover, as described above, M3 points in a predetermined direction, upward or downward, according to the recorded information. However, since the intermediate layer 4 is a film showing an in-plane magnetization, M3 is not copied to the readout layer 3.

Here, a light beam I having a low light intensity or a light beam II having a high light intensity are alternatively irradiated. The light beam I and the light beam II have a power which can raise the temperature to T3 and T4, respectively. In the temperature-raising process, when the temperature of each layer is raised to T2 so that each layer becomes the condition B1 or B2, the intermediate layer 4 still shows an in-plane magnetization similiarly to the conditions A1 and A2. Moreover, since Hc3 is still large enough, the recording layer 5 still shows the magnetization direction of the conditions A1 or A2. Furthermore, the exchange-coupling force between the readout layer 3 and the recording layer 5 is weak since the intermediate layer 4, which shows an in-plane magnetization, exists therebetween, so the magnetization of the readout layer 3 points in the direction same as that of Hw.

Next, (a) the light beam I is continuously irradiated so that the temperature of each magnetic layer is raised to T3 (the condition C1). Therefore, since the temperature of the recording layer 5 is not lower than Tc3, M3 is extremely small. Moreover, the intermediate layer 4 shows a perpendicular magnetization. Accordingly, an extremely strong exchange-coupling force is exerted between the readout layer 3 and the recording layer 5. Here, Hc1 is larger than Hw and Hc3 is smaller than Hw. Therefore, the exchange-coupling force copies the magnetization from the readout layer 3 to the recording layer 5 through the intermediate layer 4. Thus, the sub-lattice magnetic moment of the recording layer 5 becomes parallel to the sub-lattice magnetic moment of the readout layer 3, and M3 points in a predetermined direction α (upward in the figure). Namely, the sub-lattice magnetic moment of the rare-earth metal of the recording layer 5, referred to as R3, is parallel, that is, downward in the figure, to the sub-lattice magnetic moment of the rare-earth metal of the readout layer 3, referred to as R1. Moreover, M3 points upward in the figure since the recording layer 5 shows TM rich.

The irradiation of the light beam I does not raise the temperature of the layers to temperatures higher than the above-described temperature. When the temperature of each layer falls to T1 (the condition A2) through T2 (the condition B2) after irradiation of the light beam I, M3 still points in the direction α in spite of Hw since Hc3 is larger than Hw. On the other hand, the intermediate layer 4 shows an in-plane magnetization. Therefore, since the exchange-coupling force is not exerted between the readout layer 3 and the recording layer 5, M1 still points in the direction same as that of Hw, that is, an initializing direction, in spite of M3. This means that the direction α is recorded in M3.

(b) In the condition C1, The light beam II having a high light intensity is irradiated instead of the light beam I having a low light intensity so that the temperature of each magnetic layer is raised to T4 (the condition D1). Accordingly, Hc1 becomes smaller than Hw. Moreover, since the temperature is not lower than Tcomp1, the sub-lattice magnetic moment of the transition metal of the readout layer 3 grows large; thus, the readout layer 3 becomes TM rich. Therefore, the sub-lattice magnetic moment R1 of the rare-earth metal of the readout layer 3 points reversely to the direction of Hw, that is, upward in the figure, and M1 points in the direction of Hw.

The magnetization of the intermediate layer 4 shows an in-plane magnetization as shown in the figure if T4 is higher than Ti2 and not higher than Tr2 in this embodiment.

On the otherhand, the magnetization of the intermediate layer 4 comes into the same condition as that of the readout layer 3 if T4 is not lower than Tcomp2 and not higher than Ti2. Namely, since it is not lower that Tcomp2, the sub-lattice magnetic moment of the transition metal of the intermediate layer 4 grows large so that the layer shows TM rich. Therefore, the sub-lattice magnetic moment of the rare-earth metal of the intermediate layer 4 points reversely to the direction of Hw, that is, upward in the figure, and the magnetization of the intermediate layer 4 points in the direction of Hw.

On the other hand, the magnetization of the recording layer 5 disappears because its temperature is not lower than its Curie temperature Tc3.

In the temperature-falling process to T3 which takes place after irradiation of the light beam II, since the temperature becomes not higher than Tcomp1, the sub-lattice magnetic moment of the transition metal of the readout layer 3 becomes small so that the readout layer 3 becomes RE rich again. On the other hand, the magnetization of the intermediate layer 4 is either in the in-plane condition as described above or in the same condition as that of the readout layer 3. Moreover, the magnetization of the recording layer 5 does not exist because its temperature is not lower than its Curie temperature Tc3. Therefore, R1 remains pointing reversely to the direction of Hw, and M1 points in the direction of R1, that is, reversely to that of Hw.

In the case when the temperature falls to T3 (the condition C2), since Hc1 is larger than Hw, directions of R1 and M1 are fixed to the above-described directions respectively. Therefore, the condition does not change from C2 to C1. On the other hand, since the intermediate layer 4 shows a perpendicular magnetization, an exchange-coupling force is exerted between the readout layer 3 and the recording layer 5. Therefore, the magnetization direction is copied from the readout layer 3 to the recording layer 5 through the intermediate layer 4, and the sub-lattice magnetic moments of the recording layer 5 become parallel to the sub-lattice magnetic moments of the readout layer 3. Thus, the magnetization M3 of the recording layer 5 points in a predetermined direction β, (that is, downward in the figure,) reverse to α. Namely, the sub-lattice magnetic moment R3 of the rare-earth metal of the recording layer 5 becomes parallel to the sub-lattice magnetic moment R1 of the rare-earth metal of the readout layer 3, that is, upward in the figure, and since the recording layer 5 is TM rich here, M3 points downward in the figure.

In the case when the temperature falls to T1 (the condition A1) through T2 (the condition B1), since Hc3 is larger than Hw, M3 stably keeps pointing in the above-described direction β in spite of Hw. On the other hand, since the intermediate layer 4 shows an in-plane magnetization, the exchange-coupling force between the readout layer 3 and the recording layer 5 is no longer exerted or becomes weak. Here, since Hc1 is smaller than Hw, M1 is initialized to the direction of Hw. This means that the direction β is recorded in M3.

As described above, whether the initial condition is A1 or A2, by the light beam I having a comparatively low light intensity, the temperatures of the layers are raised according to the paths a1 and a2 and fall according to the paths b1 and b2 as shown in the figure to reach the condition A2, thereby allowing information to be recorded. On the other hand, whether the initial condition is A1 or A2, by the light beam II having a comparatively high light intensity, the temperatures of the layers are raised according to the paths a1, a2, and a3 and fall according to the paths c1, c2 and c3 as shown in the figure to reach the condition A1, thereby allowing information to be recorded.

In other words, the intermediate layer 4, which is provided as described above, makes it possible to strengthen an exchange-coupling force so as to help copying when the magnetization is copied from the readout layer 3 to the recording layer 5, and also to weaken the exchange-coupling force so as to prevent copying from the recording layer 5 to the readout layer 3 when the magnetization direction of the readout layer 3 is initialized.

This means that the magnetization direction of the readout layer 3 is not changed by the recording layer 5 after recording. For this reason, as described above, by performing the initialization of the readout layer 3 at the same time when recording is finished, it is not necessary to perform initialization again prior to recording at the beginning of the next recording. Consequently, it becomes unnecessary to provide a device for generating an initializing magnetic field that arranges the magnetization direction before performing optical modulation overwriting, and it becomes possible to prevent increases of the size and the manufacturing costs of the apparatus.

Moreover, since the intermediate layer 4 controls the magnetic exchange-coupling force between the recording layer 5 and the readout layer 3 as described above, the magnetization direction of the readout layer 3 can be easily controlled by using an external magnetic field Hw, and the optical modulation overwriting property can be stabilized.

Figure 4:
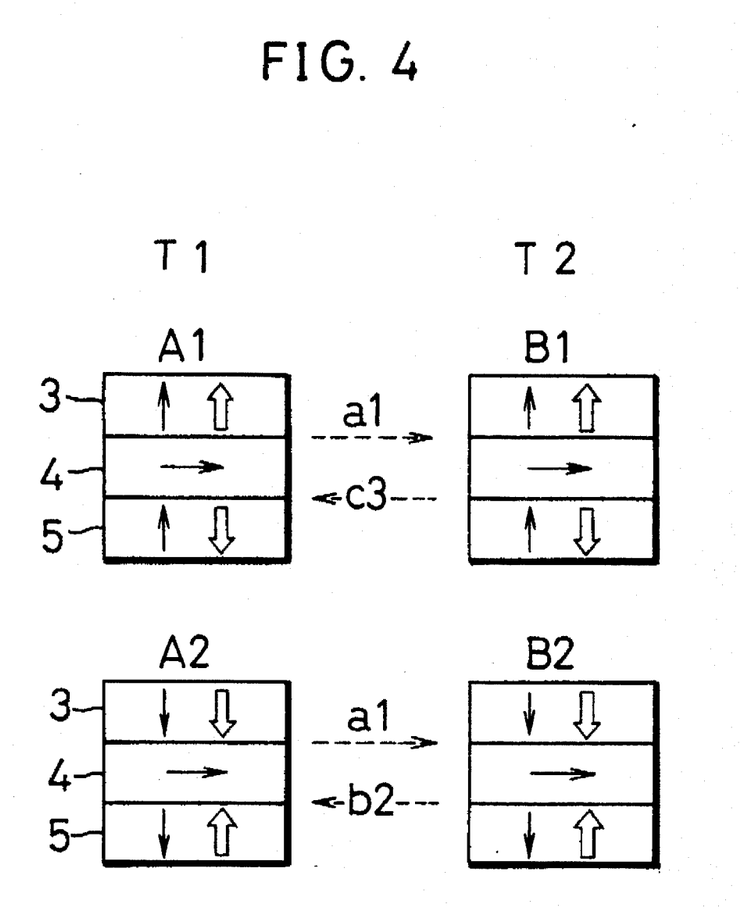
FIG. 4 is an explanatory figure showing the reproducing process in the magneto-optical disk as shown in FIG. 1.

The following description will discuss an information reproducing process with reference to FIG. 4. In the figure, legends such as arrows are the same as those in FIG. 3.

During reproduction, different from recording, an external magnetic field like the recording magnetic field Hw is not applied. The light beam III whose light intensity is lower than that of the light beam I is irradiated to the magneto-optical disk 10, thereby raising the temperature of the layers to T2.

Since an external magnetic field, such as the magnetic field Hw, is not applied at this time, the direction of M1 is determined according to the magnetic exchange-coupling force exerted from the recording layer 5. Meanwhile, although the intermediate layer 4 shows an in-plane magnetization, it has a predetermined amount of the perpendicular magnetization component because it is put between the readout layer 3 and the recording layer 5 which show perpendicular magnetizations. Therefore, the exchange-coupling force is exerted from the recording layer 5 to the readout layer 3 through the intermediate layer 4. Consequently, the sub-lattice magnetic moments of the readout layer 3 are positively arranged to the direction parallel to the sub-lattice magnetic moments of the recording layer 5 respectively; thus, the direction of M1 is positively determined. In other words, the sub-lattice magnetic moment R1 of the rare-earth metal of the readout layer 3 becomes parallel, that is, upward in the condition A1 and downward in the condition A2, to the sub-lattice magnetic moment R3 of the rare-earth metal of the recording layer 5. Moreover, since the readout layer 3 shows RE rich, M1 points in the same direction as that of R1, that is, upward in the condition A1 and downward in the condition A2. In this way, the magnetization recorded in the recording layer 5 is copied to the readout layer 3 and reproduced as information.

The next description will discuss various measured results in the actual recording and reproduction in accordance with the above-described processes.

The magneto-optical disk 10 was used for recording and reproduction and rotated at the linear speed of 10 m/s at the position of laser beam irradiation. The recording magnetic field Hw of 20 kA/m was applied. The first laser power of the light beam I and the second laser power of the light beam II were set to 6 mW and 10 mW respectively, and recording was performed by modulating the laser powers with a frequency of 2.5 MHz. As a result, reversed magnetic domains were formed with a cycle of 4 μm and a length of 2 μm on the recording layer 5.

Moreover, recorded information was reproduced at a laser power of 2 mW. The magneto-optical signal of 2.5 MHz was obtained from the readout layer 3 in accordance with the reversed magnetic domains which were formed on the recording layer 5, and therefore a good reproducing signal with a C/N ratio of 48.5 dB was obtained.

Next, overwriting was performed by modulating the laser powers with a frequency of 5 MHz onto the reversed magnetic domains which were formed at 2.5 MHz. As a result, the reversed magnetic domains, which had been formed at 2.5 MHz, vanished and new reversed magnetic domains were formed with a cycle of 2 μm and a length of 1 μm on the recording layer 5.

Moreover, recorded information was reproduced at a laser power of 2 mW. The magneto-optical signal of 5 MHz and a C/N ratio of 47.2 dB was obtained from the readout layer 3 in accordance with the reversed magnetic domains which were formed on the recording layer 5. Namely, the signal component of 2.5 MHz, which was previously recorded, was lowered to the level of 8.5 dB; thus it was confirmed that good optical modulation overwriting with an erasing ratio of −40 dB was performed.

Next, the above-described measurements were performed by using the readout layer 3 and the intermediate layer 4, whose compositions had been changed, and TABLE 1 shows the results thereof. Here, the compositions of the readout layer 3, the intermediate layer 4 and the recording layer 5 were set respectively to $Gd_{0.28}(Fe_x Co_{1-x})_{0.72}$, $Gd_{0.28}(Fe_y Co_{1-y})_{0.72}$ and $Dy_{0.20}(Fe_{0.78} Co_{0.22})_{0.80}$, and TABLE 1 shows numeric values of Tcomp1, Tr2, Tcomp2, Ti1 and Ti2, a C/N ratio at 2.5 MHz, and an erasing ratio in overwriting a newly-recorded pattern of 5 MHz onto the already-recorded pattern of 2.5 MHz by optical modulation. Here, the unit of X and Y are both %, and that of Tcomp1, Tr2, Tcomp2, Ti1, Ti2 is °C., and that of the C/N ratio and the erasing ratio, which is referred to as ER, is dB.

TABLE 1

| X | Y | Tcomp1 | Tr2 | Tcomp2 | Ti1 | Ti2 | C/N | ER |
| --- | --- | --- | --- | --- | --- | --- | --- | --- |
| 65 | 45 | 250 | 385 | — | — | — | 46.1 | −10 |
| 65 | 50 | 250 | 385 | 240 | 200 | 300 | 47.1 | −40 |
| 65 | 53 | 255 | 380 | 245 | 175 | 330 | 47.5 | −41 |
| 65 | 56 | 250 | 375 | 240 | 140 | 360 | 47.1 | −40 |
| 65 | 60 | 245 | 380 | 250 | 80 | 370 | 47.3 | −35 |
| 65 | 65 | 250 | 380 | 240 | 20 | 380 | 47.2 | −10 |
| 70 | 45 | 250 | 385 | — | — | — | 46.1 | −10 |
| 70 | 50 | 250 | 360 | 260 | 200 | 300 | 46.5 | −42 |
| 70 | 53 | 245 | 365 | 255 | 175 | 355 | 45.8 | −40 |
| 70 | 56 | 245 | 360 | 255 | 135 | 360 | 46.2 | −39 |
| 70 | 60 | 240 | 355 | 250 | 85 | 365 | 46.5 | −35 |
| 70 | 60 | 240 | 360 | 260 | 20 | 385 | 46.4 | −10 |

As clearly shown in the table, if Y=65%, the intermediate layer 4 shows a perpendicular magnetization at room temperature; thus good optical modulation overwriting property was not obtained, and the erasing ratio is as bad as −10 dB. Moreover, if Y=45%, there is no temperature range wherein the intermediate layer 4 shows a perpendicular magnetization; thus the exchange-coupling between the recording layer 5 and the readout layer 3 was not sufficient; the result is that good optical modulation overwriting property was not obtained, and that the erasing ratio is as bad as −10 dB. In contrast, since an intermediate layer 4, which satisfies the condition 45%<Y<65%, is provided, a good erasing ratio between −35 dB and −42 dB was obtained, and a stable and good optical modulation overwriting property was obtained. Therefore, the above-described Y needs to satisfy the condition 45%<Y<65%.

[Second Embodiment]

Referring to FIGS. 5 through 8, the following description will discuss another embodiment of the present invention. Here, for convenience of explanation, those members that have the same functions described in the aforementioned embodiment are indicated by the same reference numerals and the description thereof is omitted.

Figure 5:
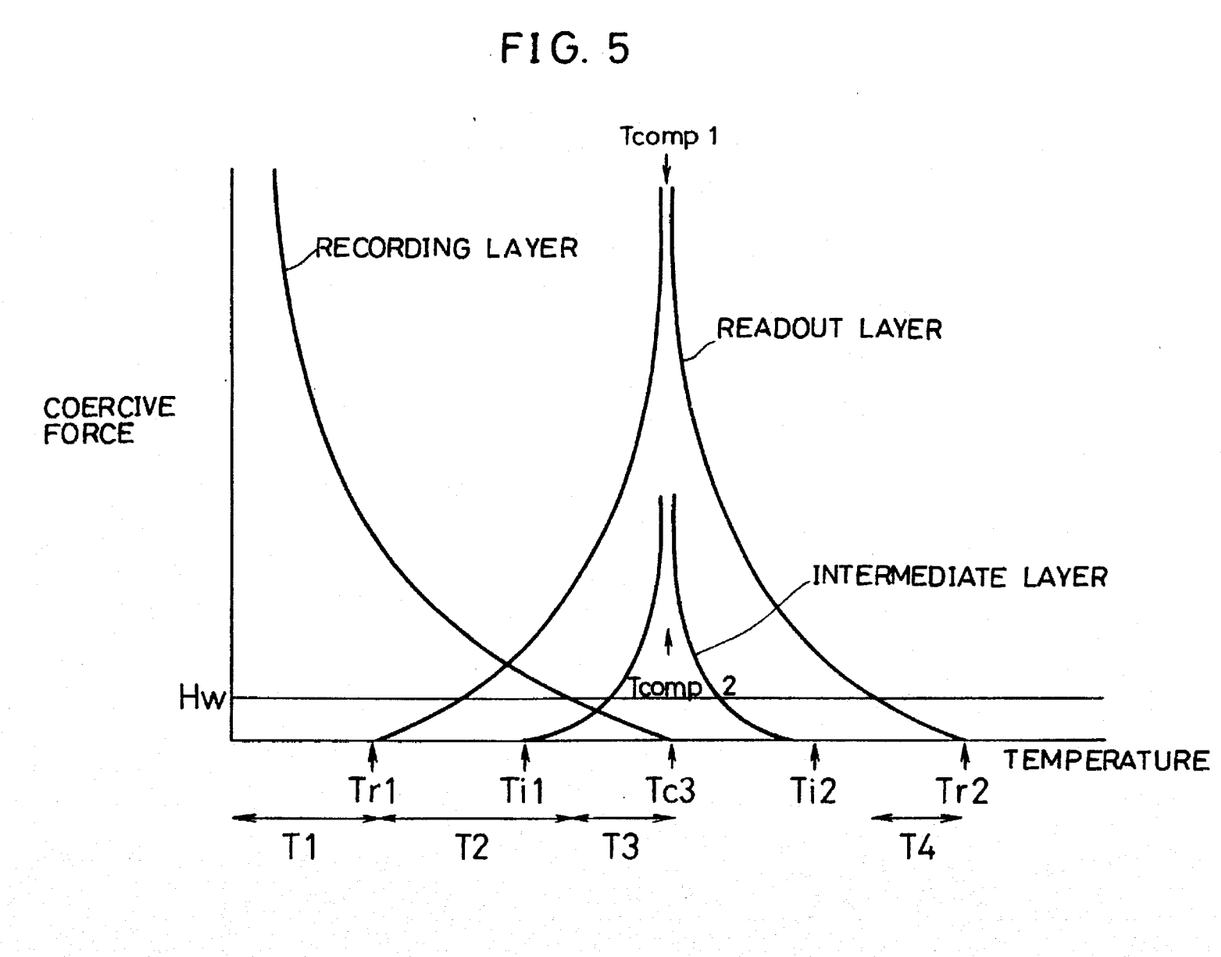
FIG. 5 is a graph showing the dependency of the magnetic property upon the temperature in the magnetic layers of a magneto-optical disk in another embodiment of the present invention.

The magneto-optical disk 20 (the magneto-optical recording medium) in the present embodiment has a similar arrangement to that of the first embodiment. However, a readout layer 23, which will be described below, is provided instead of the readout layer 3. The readout layer 23, which is an amorphous film composed of a rare-earth and transition metal alloy, is a ferri-magnetic material where the sub-lattice magnetic moment of the rare-earth metal and that of the transition metal are antiparallel to each other. The readout layer 23 is prepared by forming GdFeCo, which is a thin film composed of a rare-earth and transition metal alloy with a thickness of 40 nm.

The readout layer 23 has a composition of $Gd_{0.28}(Fe_{0.60} Co_{0.40})_{0.72}$ and a compensation temperature of 250° C., and its magnetization condition is in-plane at room temperature, perpendicular at not lower than about 80° C., and in-plane at not lower than about 350° C.

The magneto-optical disk 20 was made by a similar method to that of the first embodiment 1.

Next, FIG. 5 shows conceptually a magnetic property of the magneto-optical disk 20 in the present embodiment that is provided with the above-described layers.

The readout layer 23 shows an in-plane magnetization at room temperature T1 and a perpendicular magnetization at not lower than a temperature Tr1, and has its compensation temperature Tcomp1 in the vicinity of the Curie temperature Tc3 of the recording layer 5. Moreover, the readout layer 23 has its Curie temperature at a temperature Tr2, or alternatively, shows an in-plane magnetization at temperatures not lower than the temperature Tr2. The intermediate layer 4 and the recording layer 5 are respectively the same as those in the first embodiment.

Moreover, the following definitions are made: T3 indicates a temperature not lower than Ti1, not higher than Tcomp1, and not higher than Tcomp2. T4 indicates a temperature not lower than Tc3, not lower than Tcomp1, not lower than Tcomp2, and not higher than Tr2. Hw indicates a recording magnetic field which is a magnetic field externally applied during recording. Hc1 and Hc3 respectively indicate the coercive force of the readout layer 23 and that of the recording layer 5. Tr1 is lower than Ti1. Moreover, the coercive forces Hc1 and Hc3 and the temperatures T1, T3, and T4 satisfy the conditions:

when the temperature is T1, Hc1<Hw and Hw<Hc3;
when the temperature is T3, Hc3<Hw and Hw<Hc1; and
when the temperature is T4, Hc1<Hw.

Figure 6:
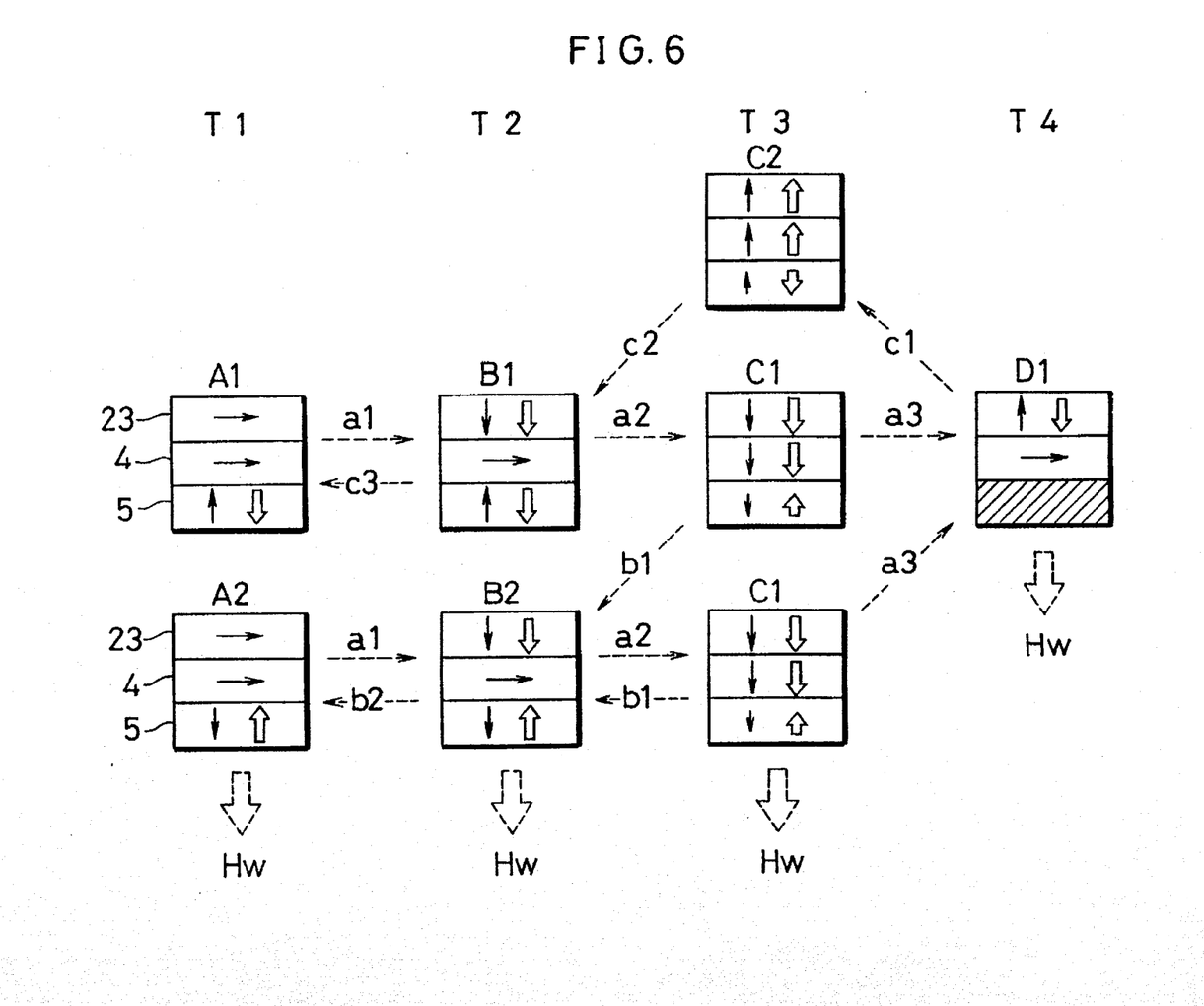
FIG. 6 is an explanatory figure showing the recording process in the magneto-optical disk as shown in FIG. 5.

Referring to FIG. 6, the next description will discuss a recording process by which optical modulation overwriting onto the magneto-optical disk 20 is carried out. In the figure, T1, T3, and T4 are the temperatures as described above. Temperature T2 is an arbitrary temperature between Tr1 and Ti1. The temperature becomes higher in the order of T1, T2, T3, and T4. A1, A2, . . . , B1, B2, . . . indicate respective conditions shown in the figure. Each condition shows the states of the readout layer 23, the intermediate layer 4, and the recording layer 5 at the highest box, the middle box, and the lowest box, respectively. In each layer, a black arrow indicates the direction of the sub-lattice magnetic moment of the rare-earth metal, and a white arrow indicates the direction of the total magnetization. In the magneto-optical 20, at room temperature, the readout layer 23 and the intermediate layer 4 are RE rich and the recording layer 5 is TM rich.

Two conditions A1 and A2 exist dependently on the recorded information at room temperature. Namely, according to the recorded information, the magnetization of the recording layer 5, referred to as M3 hereinafter, points downward in the condition A1 and upward in the condition A2.

In the conditions A1 and A2, the recording magnetic field Hw pointing downward in the figure is applied from a magnetic field generating apparatus (not shown) onto the portion which receives the light beam on the magneto-optical disk 20. Here, the magnetization referred to as M1 of the readout layer 23 is in-plane. Moreover, the magnetization of the recording layer 5, referred to as M3, points in a predetermined direction, upward or downward, according to the recorded information. However, since the intermediate layer 4 shows an in-plane magnetization, M3 is not copied to the readout layer 23.

Here, a light beam I having a low light intensity or a light beam II having a high light intensity are alternatively irradiated. The light beam I and the light beam II have a power which can raise the temperature of the layers to T3 and T4, respectively. In the temperature-raising process, when the temperature of each layer is raised to T2 so that each layer becomes the condition B1 or B2, M1 points in the direction of Hw since Hc1 is smaller than Hw. Moreover, M3 still points in the same direction as above-described one. Since the intermediate layer 4 shows an in-plane magnetization, M3 is not copied to the readout layer 23.

Next, information is recorded similarly to the first embodiment. However, different from the first embodiment, when the temperature falls to T1 (the conditions A1 or A2), the readout layer 23 shows an in-plane magnetization again.

By providing the above-described intermediate layer 4, since the intermediate layer 4 controls the magnetic exchange-coupling force between the recording layer 5 and the readout layer 23 similarly to the first embodiment, the magnetization direction of the readout layer 23 can be easily controlled with an external magnetic field Hw, and the optical modulation overwriting property can be stabilized.

Figure 7:
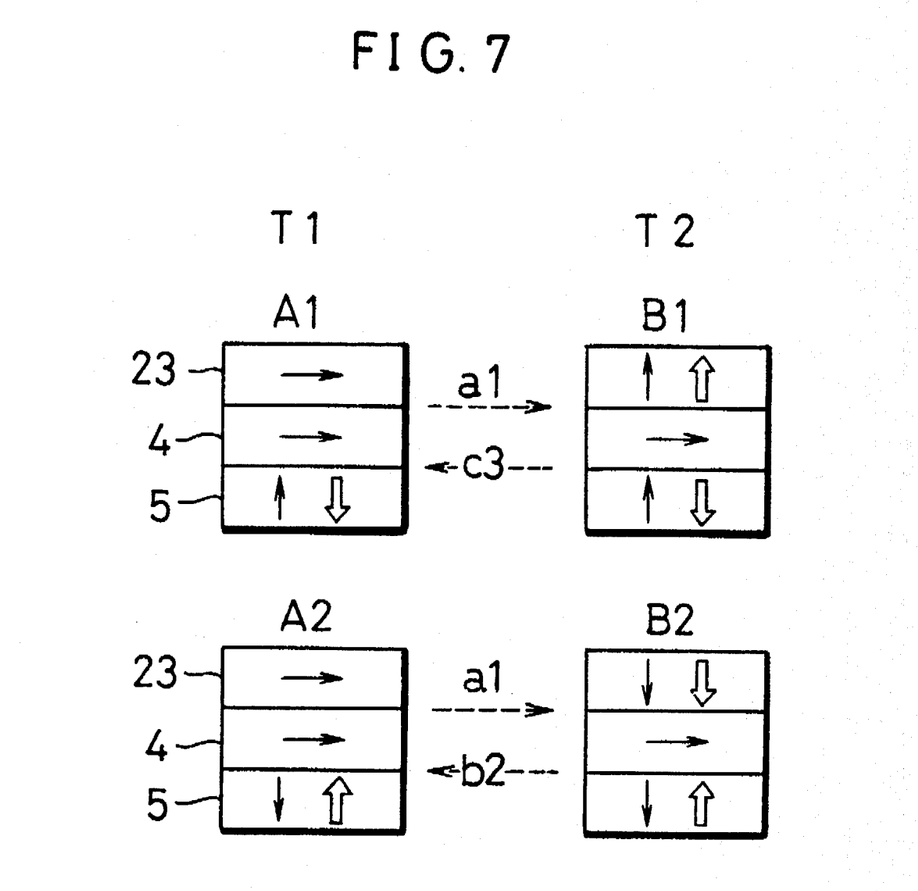
FIG. 7 is an explanatory figure showing the reproducing process in the magneto-optical disk as shown in FIG. 5.
Figure 8:
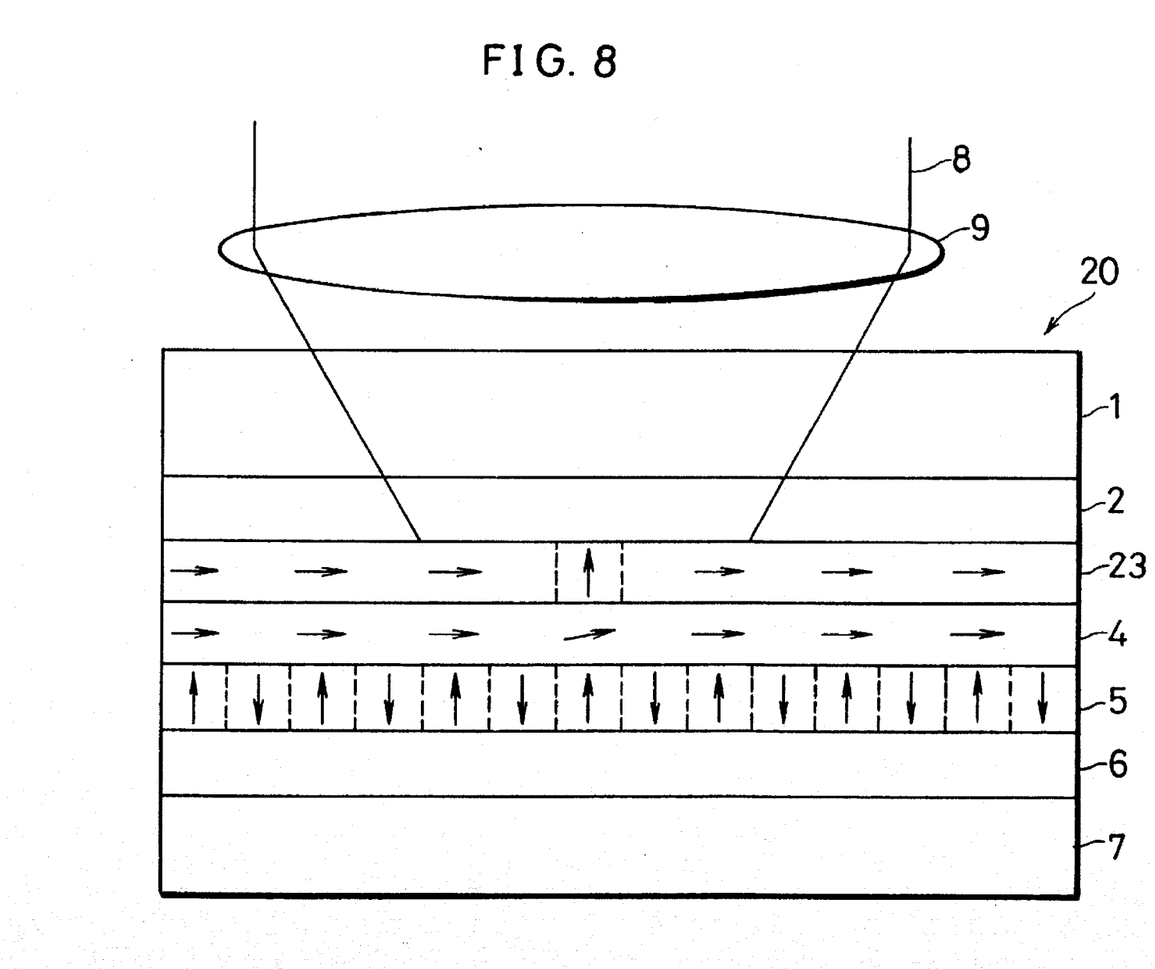
FIG. 8 is an explanatory figure showing the condition during reproduction in the magneto-optical disk as shown in FIG. 5.

The next description will discuss an information reproducing process with reference to FIGS. 7 and 8. In the figure, legends such as arrows are the same as those in FIG. 6.

During reproduction, the light beam III, whose light intensity is lower than that of the light beam I, is irradiated to the magneto-optical disk 20, thereby raising the temperature of the layers to T2.

Here, the information recorded in the recording layer 5 is reproduced in a similar way to that of the first embodiment. However, since the laser beam 8 is focused by the focusing lens 9, its light intensity distribution shows a Gaussian distribution so that the light intensity of the center of the light beam III is higher than that of the surrounding area. Therefore, when the light beam III is irradiated, the temperature in the vicinity of the center of the irradiated portion of the readout layer 23 becomes higher than the temperature of the surrounding area. Consequently, different from the first embodiment, in the readout layer 23, the temperature is raised to not lower than T2 so that the magnetization state changes from in-plane to perpendicular only at the area in the vicinity of the above-described center. Subsequently, the magnetization is copied from the recording layer 5 to the readout layer 23 only at the area in the vicinity of the above-described center. When the irradiation of the light beam III is finished, the readout layer 23 goes back to an in-plane magnetization.

Therefore, it is possible to reproduce only the information from the area in the vicinity of the center of the readout layer 23 irradiated with the light beam III. Consequently, it becomes possible to prevent signal contamination from adjacent bits that cause noise and to positively reproduce a recorded bit recorded with a pitch smaller than the spot diameter of the light beam, thereby remarkably increasing recording density.

The next description will discuss various measured results in the real recording and reproduction according to the above-described processes.

The magneto-optical disk 20 was used for recording and reproducing and rotated at the linear speed of 10 m/s at the position of laser beam irradiation. The recording magnetic field Hw of 20 kA/m was applied. The first laser power of the light beam I and the second laser power of the light beam II were set to 6 mW and 10 mW respectively, and recording was performed by modulating the laser powers with a frequency of 5 MHz. As a result, the reversed magnetic domains were formed with a cycle of 2 μm and a length of 1 μm on the recording layer 5.

Moreover, recorded information was reproduced at a laser power of 2.5 mW. The magneto-optical signal of 5 MHz was obtained from the readout layer 23 according to the reversed magnetic domains which were formed on the recording layer 5, and a good reproducing signal with a C/N ratio of 48.5 dB was obtained.

Next, overwriting was performed by modulating the laser powers with a frequency of 10 MHz onto the reversed magnetic domains which were formed at 5 MHz. As a result, the reversed magnetic domains which were formed at 5 MHz vanished and new reversed magnetic domains were formed with a cycle of 1 μm and a length of 0.5 μm on the recording layer 5.

Moreover, recorded information was reproduced at a laser power of 2.5 mW. The magneto-optical signal of 10 MHz and a C/N ratio of 47.8 dB were obtained from the readout layer 23 according to the reversed magnetic domains which were formed on the recording layer 5. In short, the signal component of 5 MHz, which was previously recorded, was lowered to the level of 8.5 dB, so it was confirmed that good optical modulation overwriting with an erasing ratio of −40 dB was performed.

Next, the above-described measurement was performed by changing the compositions of the readout layer 23 and the intermediate layer 4, and TABLE 2 shows the result. That is, the compositions of the readout layer 23, the intermediate layer 4, and the recording layer 5 were set respectively to $Gd_{0.28}$ $(Fe_x Co_{1-x})_{0.72}$, $Gd_{0.28}$ $(Fe_y Co_{1-y})_{0.72}$, and $Dy_{0.20}$ $(Fe_{0.78} Co_{0.22})_{0.80}$, and TABLE 2 shows numeric values of Tcomp1, Tr2, Tcomp2, Ti1 and Ti2, a C/N ratio at 10 MHz, and an erasing ratio in overwriting in which optical modulation makes a newly-recorded pattern of 10 MHz onto the already-recorded pattern of 5 MHz. Here, the unit of X and Y are both %, that of Tcomp1, Tr2, Tcomp2, Ti1 and Ti2 is ° C., and that of the C/N ratio and the erasing ratio, referred to as ER, is dB.

TABLE 2

| X | Y | T-comp1 | Tr1 | Tr2 | T-comp2 | Ti1 | Ti2 | C/N | ER |
|---|---|---|---|---|---|---|---|---|---|
| 60 | 45 | 250 | 80 | 365 | — | — | — | 47.3 | −10 |
| 60 | 50 | 250 | 85 | 365 | 240 | 200 | 300 | 47.8 | −40 |
| 60 | 53 | 255 | 70 | 360 | 240 | 175 | 330 | 47.2 | −41 |
| 60 | 56 | 250 | 75 | 365 | 240 | 140 | 345 | 48.0 | −40 |
| 60 | 60 | 245 | 80 | 360 | 245 | 80 | 360 | 48.5 | −9 |
| 57 | 45 | 250 | 100 | 345 | — | — | — | 47.5 | −10 |
| 57 | 50 | 255 | 105 | 355 | 260 | 200 | 300 | 47.3 | −42 |
| 57 | 53 | 250 | 100 | 350 | 255 | 175 | 355 | 47.8 | −40 |
| 57 | 56 | 245 | 100 | 350 | 245 | 135 | 360 | 46.8 | −39 |
| 57 | 60 | 240 | 95 | 360 | 250 | 85 | 365 | 46.9 | −9 |

As clearly shown in the table, if Y=60%, the lowest temperature Ti1, where the intermediate layer 4 shows a perpendicular magnetization, is not higher than the lowest temperature Tr1, where the readout layer 23 shows a perpendicular magnetization. Therefore, a good optical modulation overwriting property is not obtained, and the erasing ratio is as bad as −9 dB. Moreover, if Y=45%, there is no temperature range wherein the intermediate layer 4 shows a perpendicular magnetization so that the exchange-coupling between the recording layer 5 and the readout layer 23 was not sufficient; the result was that a good optical modulation overwriting property was not obtained, and that the erasing ratio is as bad as −10 dB. On the other hand, by providing the intermediate layer 4 which satisfies the condition 45%<Y<60%, a good erasing ratio from −35 dB to 42 dB was obtained, and a stable and good optical modulation overwriting property was obtained. Therefore, the above-described Y needs to satisfy the condition 45%<Y<60%.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:

a recording layer which is constituted of a magnetic substance where information is magneto-optically recorded and which exhibits a perpendicular direction of magnetization from room temperature T1 to a Curie temperature Tc3;

a readout layer, which is provided or said recording layer and which is constituted of a magnetic stance composed of a rare-earth transition metal alloy, from which readout layer the information recorded in said recording layer is reproduced, the readout layer having a compensation temperature Tcomp1 and exhibiting a perpendicular direction of magnetization from room temperature to a temperature Tr2 and an intermediate layer which is provided between said recording layer and said readout layer and which is constituted of a magnetic substance, the intermediate layer having a compensation temperature Tcomp2, and exhibiting a perpendicular direction of magnetization only in a temperature range from a temperature Ti1 to a temperature Ti2 including the Curie temperature Tc3 therein and an in-plane magnetization from room temperature to the temperature Ti1;

wherein defining T3 as a temperature not lower than Ti1, not higher than Tcomp1 and not higher than Tcomp2; and defining T4 as a temperature not lower than Tc3, not lower than Tcomp1, not lower than Tcomp2, and not higher than Tr2; and defining Hc1 and Hc3 respectively as a coercive force of said readout layer and a coercive force of said recording layer, for a predetermined magnetic field Hw, the following conditions are satisfied:

when a temperature of said medium is T1, Hc1<Hw and Hw<Hc3;

when a temperature of said medium is T3, Hc3<Hw and Hw<Hc1; and when a temperature of said medium is T4, Hc1<Hw.

2. The magneto-optical recording medium as defined in claim 1, wherein when compositions of said readout layer, said intermediate layer, and said recording layer are respectively selected such that $Gd_{0.28}$ $(Fe_x Co_{1-x})_{0.72}$, $Gd_{0.28}$ $(Fe_y Co_{1-y})_{0.72}$, and $Dy_{0.20}$ $(Fe_{0.78} Co_{0.22})_{0.80}$, Y satisfies a condition 45%<Y<65%.

3. The magneto-optical recording medium as defined in claim 1, wherein said intermediate layer shows a perpendicular magnetization only in a vicinity of the Curie temperature Tc3 of said recording layer.

4. The magneto-optical recording medium as defined in claim 1, wherein each of said readout layer and said intermediate layer is a ferri-magnetic substance composed of a rare-earth transition metal alloy wherein a sub-lattice magnetic moment of a rare-earth metal and a sub-lattice magnetic moment of a transition metal are antiparallel to each other.

5. A magneto-optical recording medium comprising:

a recording layer which is constituted of a magnetic substance where information is magneto-optically recorded and which exhibits a perpendicular direction of magnetization from room temperature T1 to a Curie temperature Tc3;

a readout layer, which is provided on said recording layer and which is constituted of a magnetic substance composed of a rare-earth transition metal alloy, from which readout layer the information recorded in said recording layer is reproduced, the readout layer having a compensation temperature Tcomp1 and exhibiting a perpendicular direction of magnetization only from a temperature Tr1 to a temperature Tr2 and an in-plane direction of magnetization from room temperature to the temperature Tr1; and an intermediate layer which is provided between said recording layer and said readout layer and which is constituted of a magnetic substance, the intermediate layer having a compensation temperature Tcomp2, and exhibiting a perpendicular direction of magnetization only in a temperature range from a temperature Ti1 to a temperature Ti2 including the Curie temperature Tc3 therein and an in-plane direction of magnetization from room temperature to the temperature Ti1;

wherein defining T3 as a temperature not lower than Ti1, not higher than Tcomp1, and not higher than Tcomp2; and defining T4 as a temperature not lower than Tc3, not lower than Tcomp1, not lower than Tcomp2, and not higher than Tr2; and defining Hc1 and Hc3 respectively as a coercive force of said readout layer and a coercive force of said recording layer, for a predetermined magnetic field Hw; the following conditions are satisfied;

when a temperature of said medium is T1, Hc1<Hw and Hw<Hc3;

when a temperature of said medium is T3, Hc3<Hw and Hw<Hc1; and when a temperature of said medium is T4, Hc1<Hw.

6. The magneto-optical recording medium as defined in claim 5, wherein when compositions of said readout layer, said intermediate layer, and said recording layer are respectively selected such that $Gd_{0.28}(Fe_x Co_{1-x})_{0.72}$, $Gd_{0.28}(Fe_y Co_{1-y})_{0.72}$, and $Dy_{0.20}(Fe_{0.78} Co_{0.22})_{0.80}$, Y satisfies a condition 45%<Y<60%.

7. The magneto-optical recording medium as defined in claim 5, wherein said intermediate layer shows a perpendicular direction of magnetization only in a vicinity of the Curie temperature Tc3 of said recording layer.

8. The magneto-optical recording medium as defined in claim 5, wherein each of said readout layer and said intermediate layer is a ferri-magnetic substance composed of a rare-earth transition metal alloy where a sub-lattice magnetic moment of a rare-earth metal and a sub-lattice magnetic moment of a transition metal are anti-parallel to each other.

9. A method of recording and reproducing magneto-optical information using a recording medium having a recording layer, a readout layer and an intermediate layer interposed therebetween, said method comprising:

a recording step of recording information as a magnetization pattern onto said recording layer; and a reproducing step of reproducing the information stored as the magnetization pattern recorded on the recording layer, wherein the recording step includes the steps of:

applying a magnetic field Hw onto the magneto-optical recording medium;

shining a first light beam (I), having a low light intensity, onto said magneto-optical recording medium according to recorded information, thereby making a sub-lattice magnetic moment, of a rare-earth metal of said readout layer, point in a direction of the field Hw and making a magnetization direction of said recording layer point in a predetermined direction due to an exchange-coupling force from said readout layer; and shining a second light beam (II), having a high light intensity higher than the light intensity of the first light beam (I), onto said magneto-optical recording medium according to recorded information, thereby making a sub-lattice magnetic moment, of a rare-earth metal of said readout layer, point in a direction opposite to a direction of the field Hw and making, due to an exchange-coupling force from said readout layer, a magnetization direction, of said recording layer, point in a predetermined direction opposite to the direction in which said recording layer points when the first light beam (I) is applied, and the reproducing step includes the step of:

shining a third light beam (III), having a light intensity lower than the light intensity of the first light beam (I), onto said magneto-optical recording medium; and orienting a sub-lattice magnetization of said readout layer in a direction which stable for a sub-lattice magnetization of said recording layer after application of the third light beam (III).

10. The method of recording and reproducing magneto-optical information as defined in claim 9, which:

raises temperatures of said readout layer, said intermediate layer, and said recording layer to the T3 by irradiating the light beam I; and raises temperatures of said readout layer, said intermediate layer, and said recording layer to the T4 by irradiating the light beam II, in the recording step and raises temperatures of said readout layer, said intermediate layer, and said recording layer to a temperature higher than room temperature and lower than the Ti1 by irradiating the light beam III in the reproducing step.

11. The method of recording and reproducing magneto-optical information as defined in claim 10, which raises temperatures of said readout layer, said intermediate layer, and said recording layer to a temperature ranging from Tcomp2 to Ti2 by irradiating the light beam II in the recording step.

12. The method of recording and reproducing magneto-optical information as defined in claim 10, which raises temperatures of said readout layer, said intermediate layer, and said recording layer to a temperature ranging from Ti2 to Tr2 by irradiating the light beam II in the recording step.

13. The method of recording and reproducing magneto-optical information as defined in claim 10, wherein a magnetization direction of said readout layer is arranged to a direction of Hw in a temperature range from room temperature to T3 in the step applying a magnetic field Hw.

14. A method of recording and reproducing magneto-optical information using a recording medium having a recording layer, a readout layer and an intermediate layer interposed therebetween, said method comprising:

a recording step of recording information as a magnetization pattern onto said recording layer; and a reproducing step of reproducing the information stored as the magnetization pattern recorded on the recording layer, wherein the recording step includes the steps of:

applying a magnetic field Hw onto the magneto-optical recording medium;

shining a first light beam (I), having a low light intensity, onto said magneto-optical recording medium according to recorded information, thereby making a sub-lattice magnetic moment, of a rare-earth metal of said readout layer, point in a direction of the field Hw and making a magnetization direction of said recording layer point in a predetermined direction due to an exchange-coupling force from said readout layer; and shining a second light beam (II), having a high light intensity higher than the light intensity of the first light beam (I), onto said magneto-optical recording medium according to recorded information, thereby making a sub-lattice magnetic moment, of rare-earth metal of said readout layer, point in a direction opposite to a direction of the field Hw and making, due to an exchange-coupling force from said readout layer, a magnetization direction, of said recording layer, point in a predetermined direction opposite to the direction in which said recording layer points when the first light beam (I) is applied, and the reproducing step includes the steps of:

shining a third light beam (III), having a light intensity lower than the light intensity of the first light beam (I) and having a distribution of light intensity in which light intensity is higher in a center of the light beam than in an area surrounding the center, onto said magneto-optical recording medium; and orienting a sub-lattice magnetization of said readout layer in a direction which is stable for a sub-lattice magnetization of said recording layer after application of the third light beam (III).

15. The method of recording and reproducing magneto-optical information as defined in claim 14, which raises the temperatures of said readout layer, said intermediate layer, and said recording layer to the temperature T3 by applying the first light beam (I); and raises temperature of said readout layer, said intermediate layer, and said recording layer to the temperature T4 by applying the second light beam (II) in the recording step, and raises the temperatures of said readout layer, said intermediate layer, and said recording layer to a temperature higher than room temperature and lower than the temperature Ti1 by applying the third light beam (III) in the reproducing step.

16. The method of recording and reproducing magneto-optical information as defined in claim 15, which raises temperatures of said readout layer, said intermediate layer, and said recording layer to a temperature ranging from Tcomp2 to Ti2 by applying the second light beam (II) in the recording step.

17. The method of recording and reproducing magneto-optical information as defined in claim 15, which raises temperatures of said readout layer, said intermediate layer, and said recording layer to a temperature ranging from Ti2 to Tr2 by applying the second light beam (II) in the recording step.

18. The method of recording and reproducing magneto-optical information as defined in claim 15, wherein a magnetization direction of said readout layer is oriented to coincide with a direction of the field Hw in a temperature range from room temperature to the temperature T3 during said step of applying a magnetic field Hw.

* * * * *